(12) United States Patent
Greenberger et al.

(10) Patent No.: US 10,547,986 B2
(45) Date of Patent: Jan. 28, 2020

(54) COGNITIVE ROOT UNIFORM RESOURCE LOCATOR

(71) Applicant: International Business Machines Corporation, Armonk, NY (US)

(72) Inventors: Jeremy A. Greenberger, Raleigh, NC (US); Zachary M. Greenberger, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 15/244,303

(22) Filed: Aug. 23, 2016

(65) Prior Publication Data

US 2018/0062951 A1  Mar. 1, 2018

(51) Int. Cl.
*H04W 4/14* (2009.01)
*H04L 12/58* (2006.01)

(52) U.S. Cl.
CPC .............. *H04W 4/14* (2013.01); *H04L 51/04* (2013.01); *H04L 51/063* (2013.01); *H04L 51/16* (2013.01); *H04L 51/18* (2013.01)

(58) Field of Classification Search
CPC ......... H04L 43/04; H04L 67/02; H04L 51/16; H04L 51/04; H04W 4/14
See application file for complete search history.

(56) References Cited

U.S. PATENT DOCUMENTS

| 7,051,072 | B2 | 5/2006 | Stewart et al. |
| 7,853,719 | B1* | 12/2010 | Cao ................ G06F 16/9566 709/245 |
| 7,954,045 | B2 | 5/2011 | Yamada et al. |
| 8,060,492 | B2 | 11/2011 | Nair et al. |
| 9,154,383 | B2 | 10/2015 | Manuel-Devadoss et al. |
| 9,300,482 | B2 | 3/2016 | Stoertenbecker |
| 2011/0300834 | A1 | 12/2011 | Ni |
| 2013/0110802 | A1 | 5/2013 | Shenoy et al. |
| 2014/0188457 | A1 | 7/2014 | Fink et al. |
| 2015/0089399 | A1* | 3/2015 | Megill ................ H04L 12/1813 715/753 |
| 2015/0199423 | A1 | 7/2015 | Lewis et al. |
| 2015/0264105 | A1 | 9/2015 | Smitha et al. |

* cited by examiner

*Primary Examiner* — El Hadji M Sall
(74) *Attorney, Agent, or Firm* — Brown & Michaels, PC; Maeve Carpenter

(57) ABSTRACT

Determining a context of communications between at least two users to determine when a root URL is being shared. The root URL being shared may then be evaluated to determine a context of need or purpose of a user of the URL and suggest whether an updated URL, which is an expanded or a direct URL would be the best fit for the user's needs and dynamically replaces the shared root URL with the updated direct URL.

17 Claims, 5 Drawing Sheets

COGNITIVE ROOT UNIFORM RESOURCE LOCATOR

BACKGROUND

The present invention relates to contextual analysis, and more specifically to cognitive root uniform resource locator (URL) based on contextual analysis of communications between users.

Often times tasks that need to be completed by others and the associated reminders are communicated by text via short message service or e-mail. The text or e-mail conventionally includes just the task at hand and does not include useful links that could help the user to achieve the tasks set out to be completed.

SUMMARY

According to one embodiment of the present invention a method of determining an applicable uniform resource locator is disclosed. The method comprising the steps of: a computer monitoring a text based conversation between at least a first user with a first device and a second user with a second device; the computer determining if the first user of the at least two users shared a uniform resource locator during the text based conversation; the computer determining, based on content and context of the text based conversation between the at least two users, an updated uniform resource locator to suggest to the second user; and the computer suggesting the updated applicable uniform resource locator to the second user to replace the shared uniform resource locator.

According to another embodiment of the present invention, computer program product for determining an applicable uniform resource locator is disclosed. The computer program product comprising: monitoring, by the computer, a text based conversation between at least a first user with a first device and a second user with a second device; determining, by the computer, if the first user of the at least two users shared a uniform resource locator during the text based conversation; determining, by the computer, based on content and context of the text based conversation between the at least two users, an updated uniform resource locator to suggest to the second user; and suggesting, by the computer, the updated uniform resource locator to the second user to replace the shared uniform resource locator.

According to another embodiment of the present invention, a system for determining an applicable uniform resource locator, comprising a computer comprising at least one processor, one or more memories, one or more computer readable storage media having program instructions executable by the computer to perform the program instructions is disclosed. The program instructions comprising: monitoring, by the computer, a text based conversation between at least a first user with a first device and a second user with a second device; determining, by the computer, if the first user of the at least two users shared a uniform resource locator during the text based conversation; determining, by the computer, based on content and context of the text based conversation between the at least two users, an updated uniform resource locator to suggest to the second user; and suggesting, by the computer, the updated uniform resource locator to the second user to replace the shared uniform resource locator.

DETAILED DESCRIPTION

Figure 1:
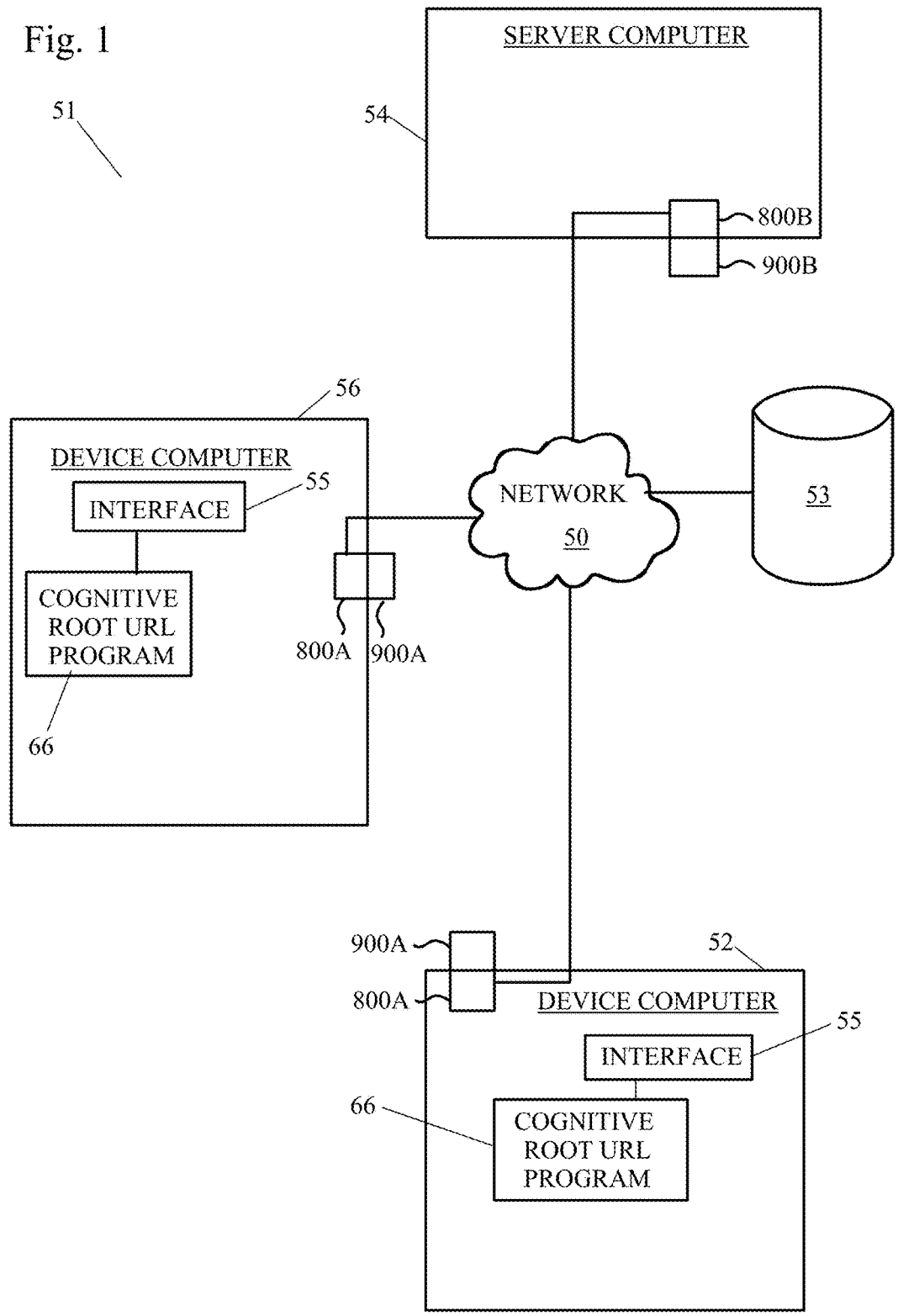
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first device computer 52, a second device computer 56, a repository 53, and a server computer 54 connect to network 50. In other exemplary embodiments, network data processing system 51 may include additional client or device computers, storage devices or repositories, server computers, and other devices not shown.

A first device computer 52 and a second device computer 56 may each contain an interface 55, which may accept commands and data entry from a user. The interface may accept entry of URLs and communication between users. The interface can be, for example, a command line interface, a graphical user interface (GUI), a natural user interface (NUI) or a touch user interface (TUI). The first device computer 52 and the second device computer 56 each preferably include a cognitive root URL program 66. While not shown, it may be desirable to have the cognitive root URL program 66 be present on the server computer 54. The first device computer 52 and the second device computer 56 each includes a set of internal components 800a and a set of external components 900a, further illustrated in FIG. 5. The first device computer 52 and the second device computer 56 may be mobile devices, personal computers, personal assistants, laptops or other devices which can communicate through a network with another device. The first device computer 52 and the second device computer 56 may each be the same type of device (e.g. mobile phones) or the first device computer 52 and the second device computer 56 may be different devices (e.g. mobile phone and laptop).

Figure 5:
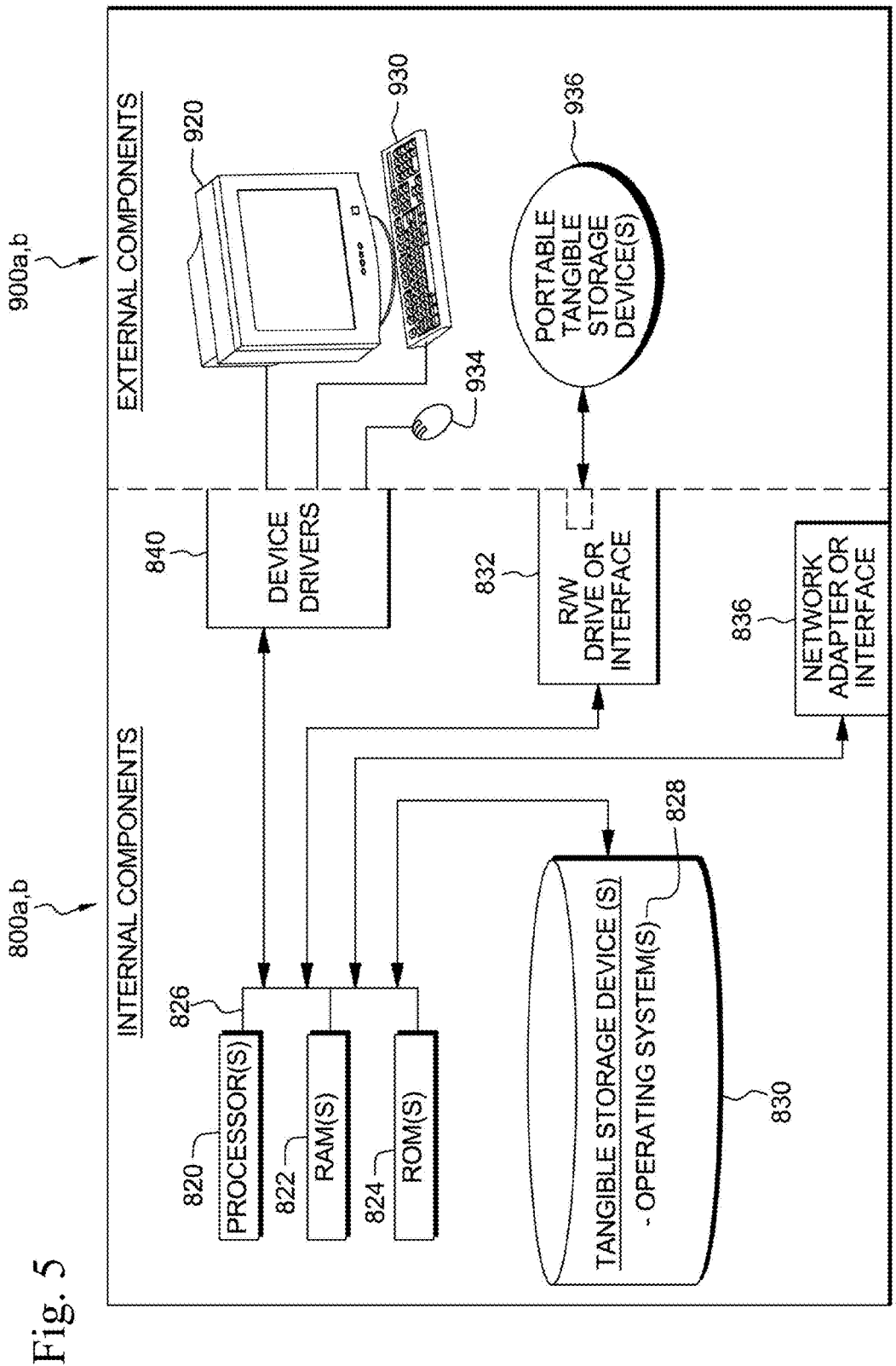
FIG. 5 illustrates internal and external components of a client computer and a server computer in which illustrative embodiments may be implemented.

Server computer 54 includes a set of internal components 800b and a set of external components 900b illustrated in FIG. 5. In the depicted example, server computer 54 provides information, such as boot files, operating system images, and applications to the first device computer 52 and the second device computer 56. Server computer 54 can compute the information locally or extract the information from other computers on network 50. The server computer 54 may contain the cognitive root URL program 66.

Program code and programs such as cognitive root URL program 66 may be stored on at least one of one or more computer-readable tangible storage devices 830 shown in FIG. 5, on at least one of one or more portable computer-readable tangible storage devices 936 as shown in FIG. 5, or on storage unit 53 connected to network 50, or may be downloaded to a first device computer 52, a second device computer 56, or server computer 54, for use. For example, program code and programs such as cognitive root URL program 66 may be stored on at least one of one or more storage devices 830 on server computer 54 and downloaded to the first device computer 52 and/or the second device computer 56 over network 50 for use. Alternatively, server computer 54 can be a web server, and the program code, and programs such as cognitive root URL program 66 may be stored on at least one of the one or more storage devices 830 on server computer 54 and accessed by the first device computer 52 and/or second device computer 56. In other exemplary embodiments, the program code, and programs such as cognitive root URL program 66 may be stored on at least one of one or more computer-readable storage devices 830 on first device computer 52, second device computer 56, or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

It should be noted that in the present application the term "direct URL" refers to the persistent URL that directs the user back to a specific item, document, page, category, or perspective. The term "root URL" refers to the entry level directory of a website.

It will be recognized in an embodiment of the present invention, a system intelligently looks at the context of communications between users to determine when a root URL is being shared. The root URL being shared may then be evaluated to determine a context of need or purpose of a user of the URL and suggest whether an expanded or a direct URL would be the most appropriate for or relevant to the user's needs and dynamically replaces the root URL with the direct URL. The most appropriate or relevant URL for the user's needs is equivalent to the "fit" of the URL.

Figure 2:
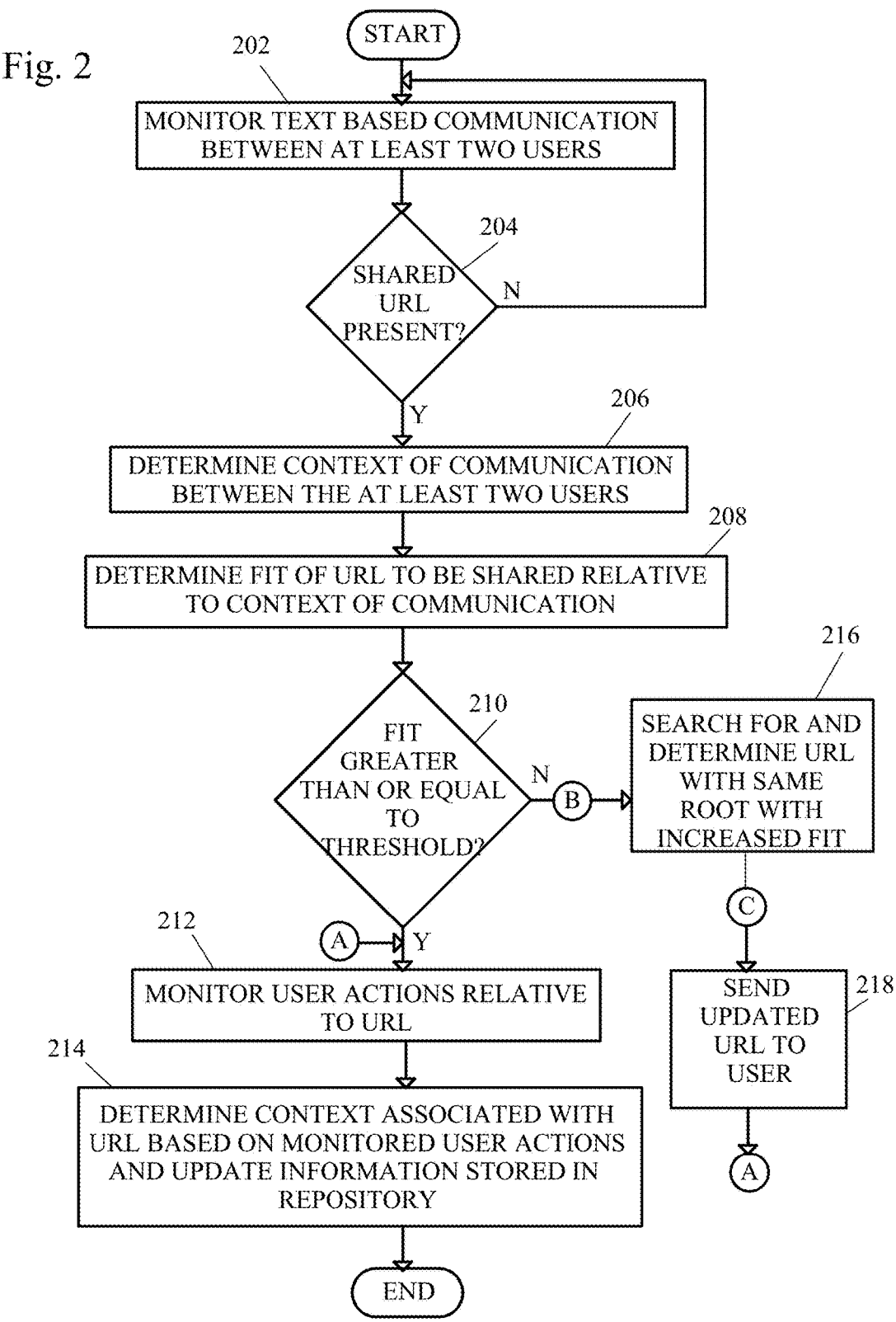
FIG. 2 shows a flow diagram of a method of cognitive root URL location.

FIG. 2 shows a flow diagram for a method of cognitive root URL location.

In a first step, the cognitive root URL program 66 monitors text based communication between at least two users on a first device and a second device (step 202). The text based communication may be, but is not limited to, e-mail, SMS, or any other text based message program. The first device may be first device computer 52 and the second device may be second device computer 56.

If a shared URL is not present in the text based communication between at least two users (step 204), the method returns to step 202 of monitoring the communication between at least two users. A shared URL is considered present if the URL is present in the text of the communication and sent to the second user or during drafting of the text by the first user, but prior to being sent to the second user.

If a shared URL is present in the text based communication between the at least two users (step 204), the cognitive root URL program 66 determines the context of the communication between the at least two users (step 206). The context may be determined through analyzation of current conversation through natural language processing, historical context from previous conversations between the users or most used URLs by the user.

Next, the cognitive root URL program 66 determines the fit of the URL to be shared relative to the context of the conversation between the at least two users by establishing weights for the shared URL based on the context and comparing the weight of the URL to be shared to a predetermined fit threshold (step 208). The weight may be based on whether other users with similar context identified have solved a similar problem using the shared URL as compared to historical context. Alternatively, the weight may be based on whether the first user has solved a similar problem using the URL which was shared.

If the fit for the URL meets or exceeds the predetermined threshold (step 210), the user actions relative to the URL are monitored (step 212).

A context associated with the URL is determined and context regarding the URL is updated and stored in a repository (step 214) and the method ends. The context of the URL may also be associated with a specific user.

If the fit for the URL does not meet or exceed the predetermined threshold (step 210), the cognitive root URL program 66 searches for and determines another URL or an updated URL with the same root that has greater fit or relevancy that will meet or exceeds the predetermined fit threshold (step 216) (e.g. a direct URL).

The determined, updated URL with greater fit is then sent to the user (step 218) and the method returns to step 212 of monitoring user actions relative to the URL.

It should be noted that the determined URL or updated URL may be sent prior to the second user accessing or visiting the shared URL from the first user or may the updated or determined URL may be sent to the first user as a suggestion prior to the first user actually sending the shared URL to the second user.

Figure 3:
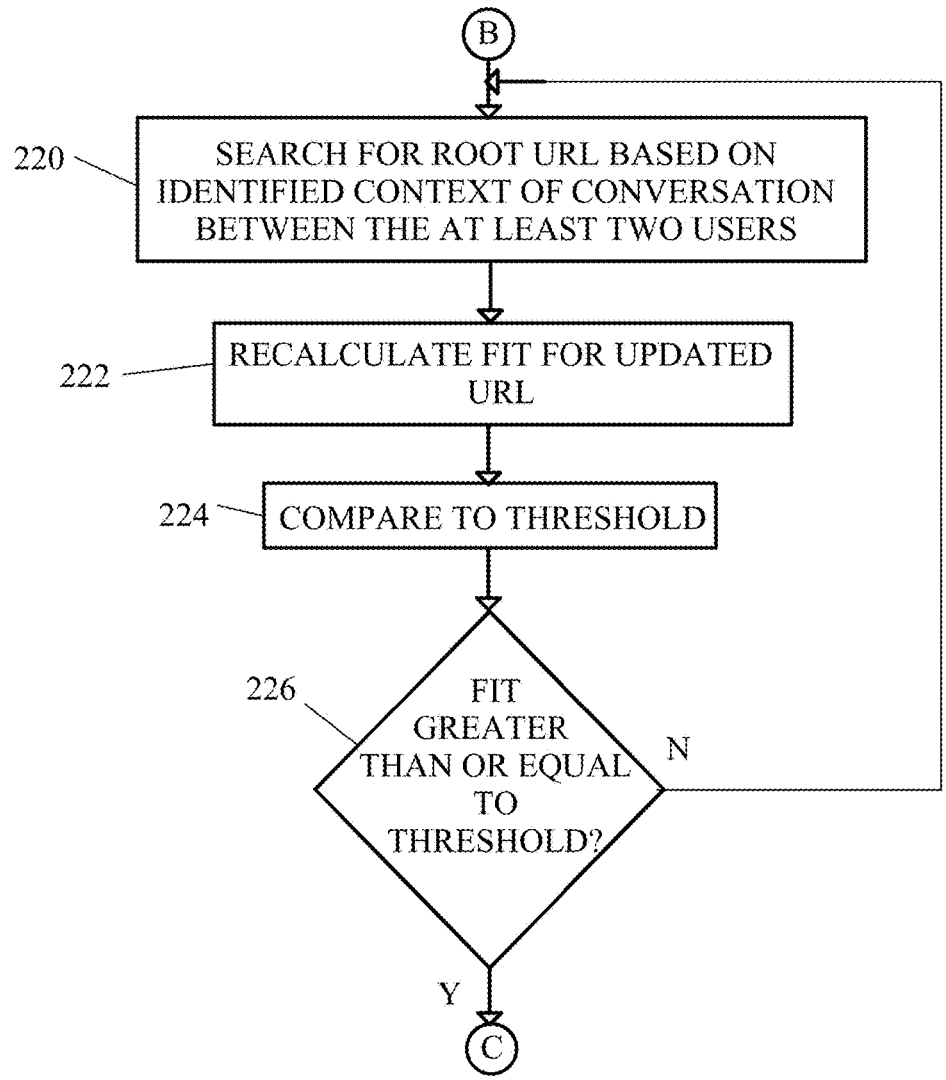
FIG. 3 shows a flow diagram of a method of searching for and determining a URL with a fit which exceeds the threshold.

FIG. 3 shows a flow diagram of a method of searching for and determining a updated URL with a fit which meets or exceeds the predefined threshold (step 216 of FIG. 2).

The cognitive URL root program 66 searches for a root URL using the identified context from the conversation between the at least two users to identify one other URL (step 220).

The fit of the one other URL is recalculated (step 222) and compared to a predetermined threshold (step 224) and if the URL meets or exceeds the predetermined threshold (step 226) the method continues to step 218 and the one other URL is the updated URL and is sent to the user. The fit or relevancy of the updated URL may be based on weights assigned for the URL based on the context of the conversation between the users.

If the one other URL does not meet or exceed the predetermined threshold (step 226), the method returns to step 220 of searching for a root URL using identified context from the conversation between the at least two users.

For example, two users are discussing a problem one of them is having with their mobile device through a SMS via text messages. A first user, through the first device suggests that the second user through the second device posts an open help ticket and sends a shared root URL of www.company.com. The cognitive root URL program detects the presence of a shared URL in the text based conversation between the first user and the second user (e.g. www.company.com). The cognitive root URL program evaluates the context of the conversation and calculates a percent confidence or weight for whether the shared URL presented would be the best fit based on the second user's projected need, for example based on natural language processing. In this example, the context of the conversation between the two users may be battery life of the mobile device. Any details regarding the battery life of the mobile device or details relevant to device within the text based conversation are provided a weight (e.g. type of device, length of battery life, operating system) as opposed to other details such as discussions between for the first user and the second user to meet later that day.

The weight may be based on whether other users have solved a similar problem using the shared URL. The other user may include the first user.

If the percent confidence or weight is below a predetermined threshold, the cognitive root URL program would search for and change the shared URL to be more direct, for example www.getsupport.company.com and send the determined, updated, more direct URL to the second user. The cognitive root URL program then monitors if the second user clicks on other pages in addition to the updated URL through the second device. The sites which are accessed by the users are used by a learning engine of the cognitive root URL program to improve confidence ranking for future cognitive URL replacements.

Figure 4:
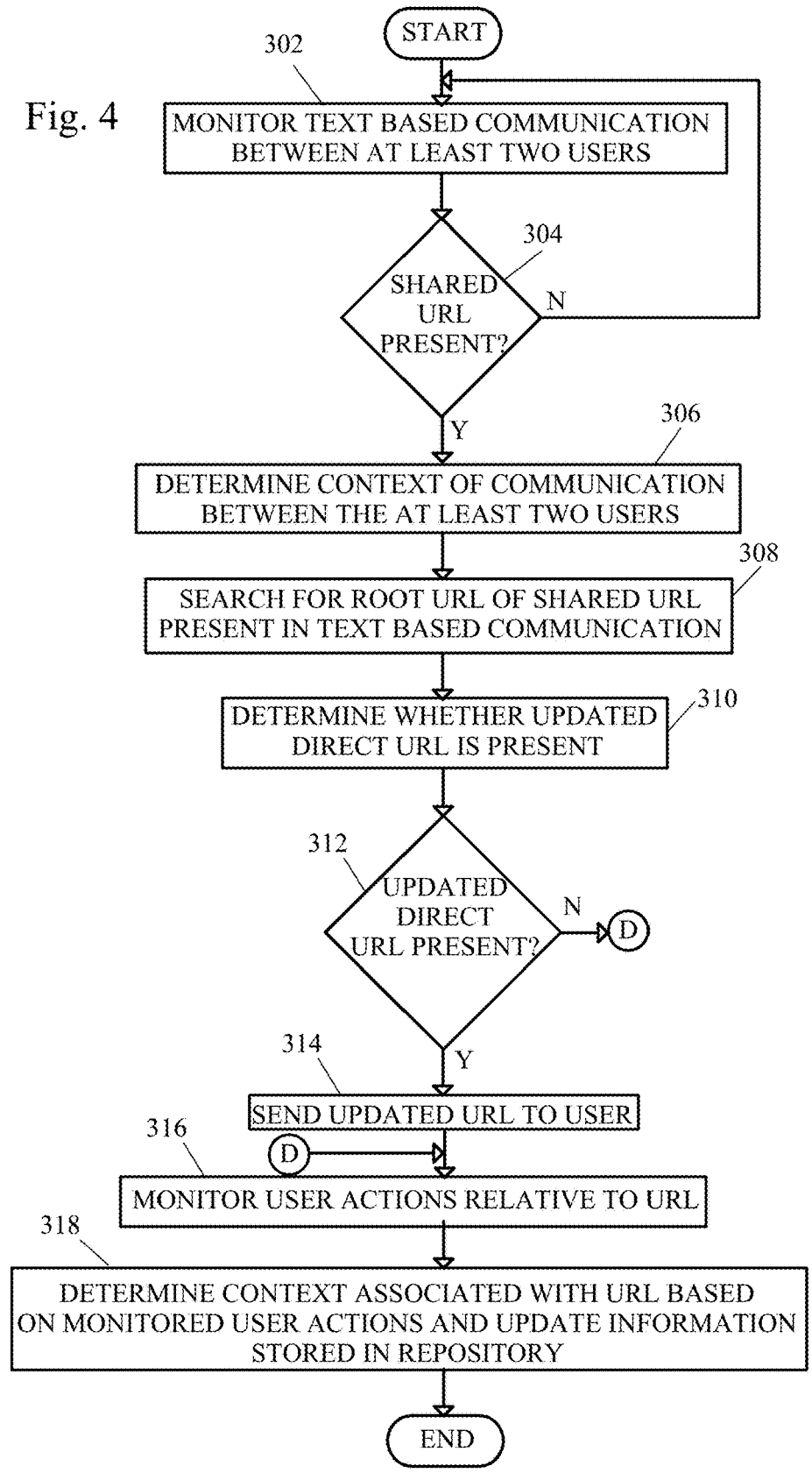
FIG. 4 shows a flow diagram of an alternate method of determining a cognitive root URL location.

FIG. 4 shows an alternate method of determining a cognitive root URL.

In a first step, the cognitive root URL program 66 monitors text based communication between at least two users on a first device and a second device (step 302). The text based communication may be, but is not limited to, e-mail, SMS, or any other text based message program. The first device may be first device computer 52 and the second device may be second device computer 56.

If a shared URL is not present in the text based communication between at least two users (step 304), the method returns to step 302 of monitoring the communication between at least two users. A shared URL is considered present if the URL is present in the text of the communication and sent to the second user or during drafting of the text by the first user, but prior to being sent to the second user.

If a shared URL is present in the text based communication between the at least two users (step 304), the cognitive root URL program determines the context of the communication between the at least two users (step 306). The context may be determined through analyzation of current conversation through natural language processing, historical context from previous conversations between the users or most used URLs by the user.

The root of the URL present in the text based communication is searched for (step 308) by the cognitive root URL program 66, for example via the network.

From the root URL, the cognitive root URL program 66 uses the conversation context between the at least two users to search for via a network, and determine whether an updated direct URL, which is better aimed or more relevant to the context of the conversation, is present (step 310). To determine whether an updated direct URL may have increased relevance to the user relative to the context of the conversation, weights may be assigned to the shared URL. The weight may be based on whether other users with similar context identified have solved a similar problem using the shared URL as compared to historical context. Alternatively, the weight may be based on whether the first user has solved a similar problem using the shared URL.

If an updated direct URL is present and has a greater weight relative to the context of the conversation between the two users (step 312), the updated direct URL is sent to the user (step 314). The user actions relative to the URL are monitored (step 316) and the context associated with the URL and the user is updated and stored in a repository (step 318) and the method ends.

If an updated URL is not present (e.g. a URL with a greater weight than the shared URL is not available) (step 312), the method continues to step 316 of monitoring the user actions relative to the URL.

FIG. 5 illustrates internal and external components of a first device computer 52, a second device computer 56, and server computer 54 in which illustrative embodiments may be implemented. In FIG. 5, a first device computer 52, a second device computer 56, and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and cognitive root URL program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device, cognitive root URL program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Cognitive root URL program 66 can be downloaded to the first device computer 52, the second device computer 56 and server computer 54 from an external computer via a network (for example, the Internet, a local area network or other, wide area network) and network adapter or interface 836. From the network adapter or interface 836, cognitive root URL program 66 is loaded into hard drive 830. Cognitive root URL program 66 can be downloaded to the server computer 54 from an external computer via a network (for example, the Internet, a local area network or other, wide area network) and network adapter or interface 836. From the network adapter or interface 836, cognitive root URL program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Cognitive root URL program 66 can be written in various programming languages including low-level, high-level, object-oriented or non object-oriented languages. Alternatively, the functions of a cognitive root URL program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining an applicable uniform resource locator, the method comprising the steps of:
    a computer monitoring a text based conversation between at least a first user with a first device and a second user with a second device;
    the computer determining if the first user of the at least two users shared a root uniform resource locator during the text based conversation;
    the computer determining, based on a content and a context of the text based conversation between the at least two users, an updated uniform resource locator to suggest to the second user; and
    the computer suggesting the updated applicable uniform resource locator to the second user to replace the shared root uniform resource locator, wherein the updated uniform resource locator contains a substitute uniform resource locator which is more applicable to the context and content of the text based conversation than the shared root uniform resource locator from the first user.

2. The method of claim 1, wherein the updated uniform resource locator is suggested to the first user prior to sending the uniform resource locator to the second user.

3. The method of claim 1, wherein the updated uniform resource locator is sent to the second user prior to vising the shared uniform resource locator from the first user.

4. The method of claim 1, wherein the updated uniform resource locator contains a same root uniform resource locator as the shared uniform resource locator.

5. The method of claim 1, wherein the step of the computer determining, based on content and context of the text based conversation between the at least two users, an updated applicable uniform resource locator to suggest to the second user further comprises the steps of the computer:
    determining context of the communication between the at least two users;
    determining a fit of the shared uniform resource locator to be shared relative to the context of the communication; and
    if the fit of the shared uniform resource locator is less than a threshold, searching for and determining the updated uniform resource locator with a same root that has a greater fit.

6. The method of claim 5, wherein the step of searching for and determining the updated uniform resource locator with a same root that has a greater fit further comprises the steps of the computer:
    searching for a root uniform resource locator using the identified context from the conversation between the at least two users;
    determining an updated uniform resource locator from the search;
    calculating weights for the updated uniform resource locator based on the determined context of the communication between the at least first user and the second user; and
    comparing the weights to the threshold.

7. The method of claim 1, further comprising the steps of the computer:
    monitoring user actions relative to the uniform resource locator sent to the second user, wherein the uniform resource locator sent to the second user is selected from the group consisting of a shared uniform resource locator and an updated uniform resource locator; and
    determining a context for the user actions and the uniform resource locator sent to the second user and storing the context associated with the uniform resource locator sent to the second user in a repository.

8. A computer program product for determining an applicable uniform resource locator, a computer comprising at least one processor, one or more memories, one or more computer readable storage media, the computer program product comprising a computer readable storage medium having program instructions embodied therewith, the program instructions executable by the computer to perform a method comprising:
    monitoring, by the computer, a text based conversation between at least a first user with a first device and a second user with a second device;
    determining, by the computer, if the first user of the at least two users shared a root uniform resource locator during the text based conversation;
    determining, by the computer, based on a content and a context of the text based conversation between the at least two users, an updated uniform resource locator to suggest to the second user; and
    suggesting, by the computer, the updated uniform resource locator to the second user to replace the shared root uniform resource locator, wherein the updated uniform resource locator contains a substitute uniform resource locator which is more applicable to the context and content of the text based conversation than the shared root uniform resource locator from the first user.

9. The computer program product of claim 8, wherein the updated uniform resource locator is suggested to the first user prior to sending the shared uniform resource locator to the second user.

10. The computer program product of claim 8, wherein the updated uniform resource locator is sent to the second user prior to vising the shared uniform resource locator from the first user.

11. The computer program product of claim 8, wherein the updated uniform resource locator contains a same root uniform resource locator as the shared uniform resource locator.

12. The computer program product of claim 8, wherein the program instructions of the determining, by the computer, based on content and context of the text based conversation between the at least two users, an updated uniform resource locator to suggest to the second user further comprises the program instructions of:
    determining, by the computer, context of the communication between the at least two users;
    determining, by the computer, a fit of the shared uniform resource locator relative to the context of the communication; and
    if the fit of the shared uniform resource locator is less than a threshold, searching for and determining, by the computer, the updated uniform resource locator with a same root that has a greater fit.

13. The computer program product of claim 12, wherein the program instructions of searching for and determining, by the computer, the updated uniform resource locator with a same root that has a greater fit further comprises the program instructions of:
- searching, by the computer, for a root uniform resource locator using the identified context from the conversation between the at least two users;
- determining, by the computer, an updated uniform resource locator from the search;
- calculating, by the computer, weights for the updated uniform resource locator; and
- comparing, by the computer, the weights to the threshold.

14. The computer program product of claim 8, further comprising the program instructions of:
- monitoring, by the computer, user actions relative to the uniform resource locator, wherein the uniform resource locator sent to the second user is selected from the group consisting of a shared uniform resource locator and an updated uniform resource locator; and
- determining, by the computer, a context for the user actions and the uniform resource locator and storing the context associated with the uniform resource locator sent to the second user in a repository.

15. A system for determining an applicable uniform resource locator, comprising a computer comprising at least one processor, one or more memories, one or more computer readable storage media having program instructions executable by the computer to perform the program instructions comprising:
- monitoring, by the computer, a text based conversation between at least a first user with a first device and a second user with a second device;
- determining, by the computer, if the first user of the at least two users shared a root uniform resource locator during the text based conversation;
- determining, by the computer, based on a content and a context of the text based conversation between the at least two users, an updated uniform resource locator to suggest to the second user; and
- suggesting, by the computer, the updated uniform resource locator to the second user to replace the shared root uniform resource locator, wherein the updated uniform resource locator contains a substitute uniform resource locator which is more applicable to the context and content of the text based conversation than the shared root uniform resource locator from the first user.

16. The computer system of claim 15, wherein the program instructions of the determining, by the computer, based on content and context of the text based conversation between the at least two users, an updated uniform resource locator to suggest to the second user further comprises the program instructions of:
- determining, by the computer, context of the communication between the at least two users;
- determining, by the computer, a fit of the shared uniform resource locator relative to the context of the communication; and
- if the fit of the shared uniform resource locator is less than a threshold, searching for and determining, by the computer, the updated uniform resource locator with a same root that has a greater fit.

17. The computer system of claim 16, wherein the program instructions of searching for and determining, by the computer, the updated uniform resource locator with a same root that has a greater fit further comprises the program instructions of:
- searching, by the computer, for a root uniform resource locator using the identified context from the conversation between the at least two users;
- determining, by the computer, an updated uniform resource locator from the search;
- calculating, by the computer, weights for the updated uniform resource locator; and
- comparing, by the computer, the weights to the threshold.

* * * * *